(12) United States Patent
Park

(10) Patent No.: US 10,761,370 B2
(45) Date of Patent: Sep. 1, 2020

(54) OPTICAL FILM AND DISPLAY DEVICE COMPRISING THE SAME

(71) Applicant: LG Display Co., Ltd., Seoul (KR)

(72) Inventor: MyungJoon Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/183,020

(22) Filed: Nov. 7, 2018

(65) Prior Publication Data

US 2019/0137826 A1 May 9, 2019

(30) Foreign Application Priority Data

Nov. 8, 2017 (KR) .................. 10-2017-0148047

(51) Int. Cl.
| | |
|---|---|
| *G02F 1/13357* | (2006.01) |
| *G02F 1/13* | (2006.01) |
| *G02B 26/08* | (2006.01) |
| *G02B 5/18* | (2006.01) |

(52) U.S. Cl.
CPC .. *G02F 1/133606* (2013.01); *G02F 1/133605* (2013.01); *G02F 1/133611* (2013.01); *G02F 2001/133607* (2013.01)

(58) Field of Classification Search
None
See application file for complete search history.

(56) References Cited

U.S. PATENT DOCUMENTS

| | | | |
|---|---|---|---|
| 4,772,097 | A | 9/1988 | Takeuchi et al. |
| 9,817,176 | B2 | 11/2017 | Kim et al. |
| 2007/0268586 | A1 | 11/2007 | Mimura et al. |
| 2008/0030985 | A1 | 2/2008 | Jeon et al. |
| 2011/0273864 | A1* | 11/2011 | Izawa ................ C09K 11/7741 362/84 |
| 2015/0219957 | A1 | 8/2015 | Kamada |
| 2016/0363708 | A1* | 12/2016 | You ........................ G02B 6/005 |
| 2017/0139101 | A1* | 5/2017 | Lee ......................... G02B 6/005 |

FOREIGN PATENT DOCUMENTS

| | | | |
|---|---|---|---|
| JP | S63-77001 A | 4/1988 | |
| JP | 2007-219050 A | 8/2007 | |
| JP | 2007219050 A | * 8/2007 | ............... G02F 1/13 |
| JP | 2007-334279 A | 12/2007 | |
| JP | 2008-041666 A | 2/2008 | |

(Continued)

OTHER PUBLICATIONS

Office Action dated Oct. 16, 2018, issued in corresponding Korean Patent Application No. 10-2017-0148047.

(Continued)

*Primary Examiner* — Edward J Glick
*Assistant Examiner* — Anthony G Quash
(74) *Attorney, Agent, or Firm* — Morgan, Lewis & Bockius LLP

(57) ABSTRACT

An optical film and a display device comprising the same are disclosed, in which luminance may be prevented from being deteriorated. The optical film comprises a first base film; a second base film spaced apart from the first base film to face the first base film; and an optical pattern arranged between the first base film and the second base film, absorbing a portion of light incident to the optical film, wherein the optical pattern has a reflective surface at one end.

5 Claims, 8 Drawing Sheets

(56) References Cited

FOREIGN PATENT DOCUMENTS

| JP | 2014-235369 A | 12/2014 |
| JP | 2016-177312 A | 10/2016 |
| JP | 2017-167506 A | 9/2017 |
| KR | 10-2008-0028403 A | 3/2008 |
| KR | 10-2009-0110655 A | 10/2009 |
| KR | 10-2016-0040172 A | 4/2016 |
| KR | 10-2016-0082789 A | 7/2016 |
| KR | 10-2016-0147121 A | 12/2016 |

OTHER PUBLICATIONS

Office Action dated Oct. 31, 2019, from the Japanese Patent Office in corresponding Japanese Patent Application No. 2018-204966.

\* cited by examiner (a)

(b)

(c)

(a)

(b)

(c)

OPTICAL FILM AND DISPLAY DEVICE COMPRISING THE SAME

BACKGROUND

Technical Field

The present disclosure relates to an optical film and a display device comprising the same.

Description of the Related Art

With the advancement of the information age, a demand for a display device for displaying an image has been increased in various forms. Therefore, various display devices such as liquid crystal display (LCD) devices, plasma display panel (PDP) devices, and organic light emitting display (OLED) devices have been used.

Among the display devices, the liquid crystal display device displays an image by controlling light transmittance of liquid crystals having dielectric anisotropy using an electric field. To this end, the liquid crystal display device includes a liquid crystal panel on which liquid crystal cells are arranged in a matrix arrangement, a driving circuit for driving the liquid crystal panel, and a backlight unit for irradiating light to the liquid crystal panel.

The backlight unit is categorized into a direct type and an edge type in accordance with an arrangement structure of light sources. The edge type has a structure that light sources are arranged at one side of a light guide plate, and the direct type has a structure that light sources are arranged below a diffuser.

The liquid crystal display device should normally provide image information to all people located at a front side or should provide image information to a specific person located at a front side. For example, in case of a personal portable information processing device, a privacy mode for providing image information to only a specific person who uses the device is required. However, an optical film of the related art absorbs much light to provide image information to a specific person only. Therefore, the liquid crystal display device of the related art has a problem in that luminance is deteriorated by the optical film for realizing the privacy mode.

BRIEF SUMMARY

The present disclosure has been made in view of the above problems, and it is an object of the present disclosure to provide an optical film and a display device comprising the same.

It is another object of the present disclosure to provide an optical film and a display device comprising the same in which luminance is prevented from being deteriorated.

In accordance with an aspect of the present disclosure, the above and other objects can be accomplished by the provision of an optical film and a display device comprising the same, the optical film comprising a first base film; a second base film spaced apart from the first base film to face the first base film; and an optical pattern arranged between the first base film and the second base film, absorbing a portion of light incident to the optical film, wherein the optical pattern has a reflective surface at one end. In other words, among the light incident at a certain angle to the optical film, the optical pattern absorbs light that is incident on portions of the optical pattern other than the reflective surface.

BRIEF DESCRIPTION OF THE SEVERAL VIEWS OF THE DRAWINGS

The above and other objects, features and other advantages of the present disclosure will be more clearly understood from the following detailed description taken in conjunction with the accompanying drawings, in which.

DETAILED DESCRIPTION DISCLOSURE

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, an optical film and a display device comprising the same according to the preferred embodiment of the present disclosure will be described with reference to the accompanying drawings. Wherever possible, the same reference numbers will be used throughout the drawings to refer to the same or like parts. Also, in the following description of the present disclosure, if detailed description of elements or functions known in respect of the present disclosure is determined to make the subject matter of the present disclosure unnecessarily obscure, the detailed description will be omitted.

Hereinafter, the preferred embodiment of the present disclosure will be described in detail with reference to the accompanying drawings.

Figure 1:
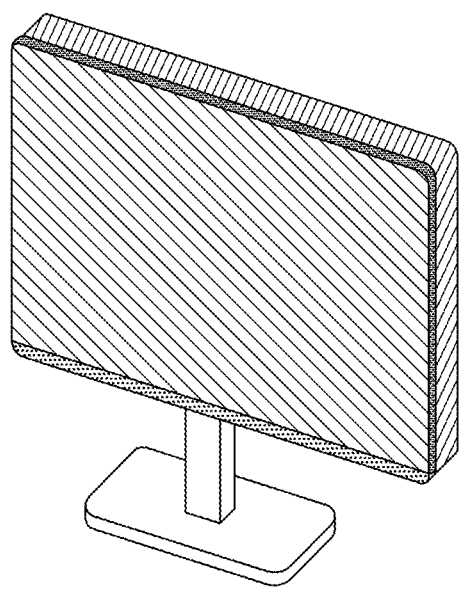
FIG. 1 is a perspective view illustrating a display device according to one embodiment of the present disclosure.
Figure 2:
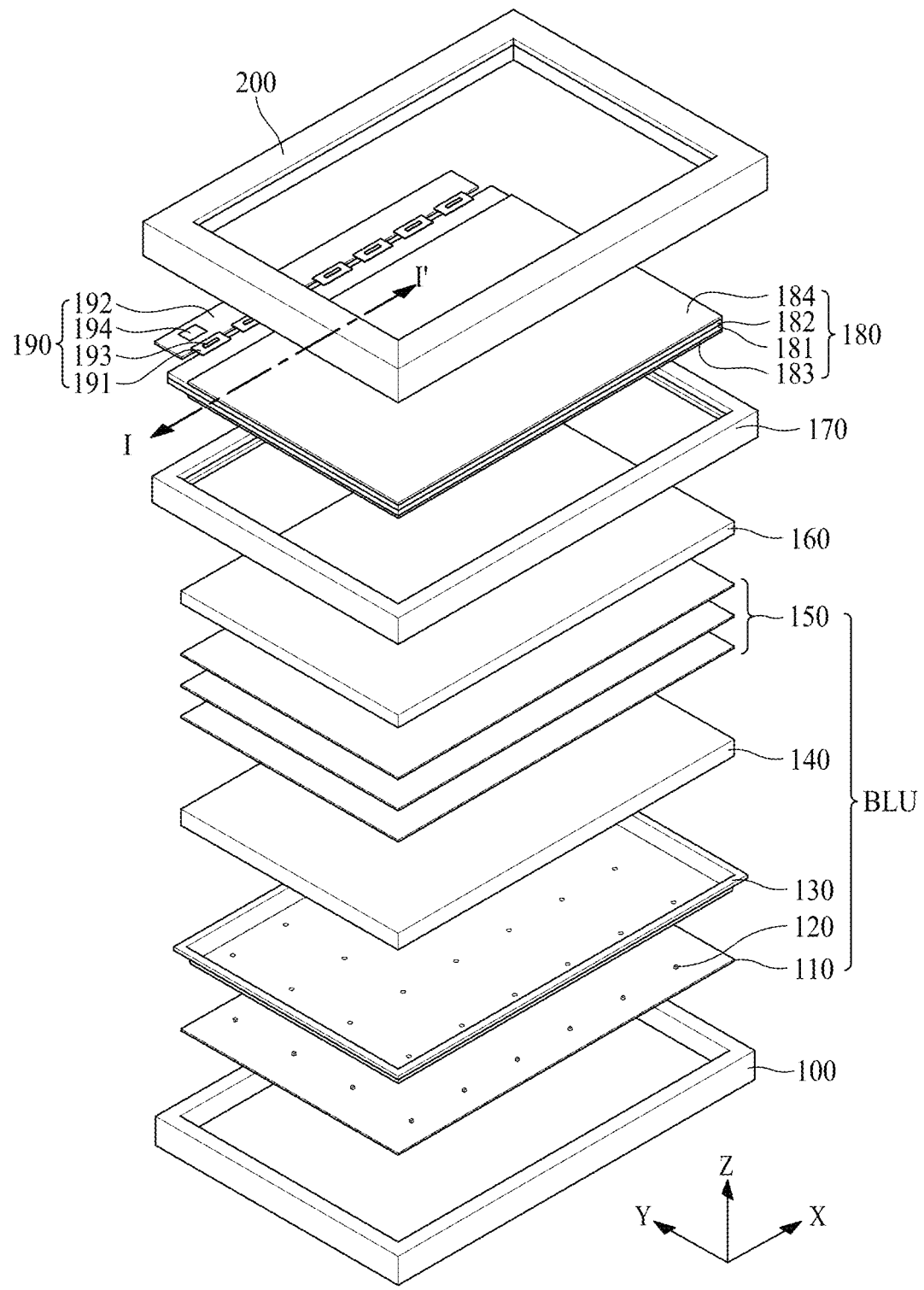
FIG. 2 is a detailed exploded perspective view illustrating a display device according to one embodiment of the present disclosure.
Figure 3:
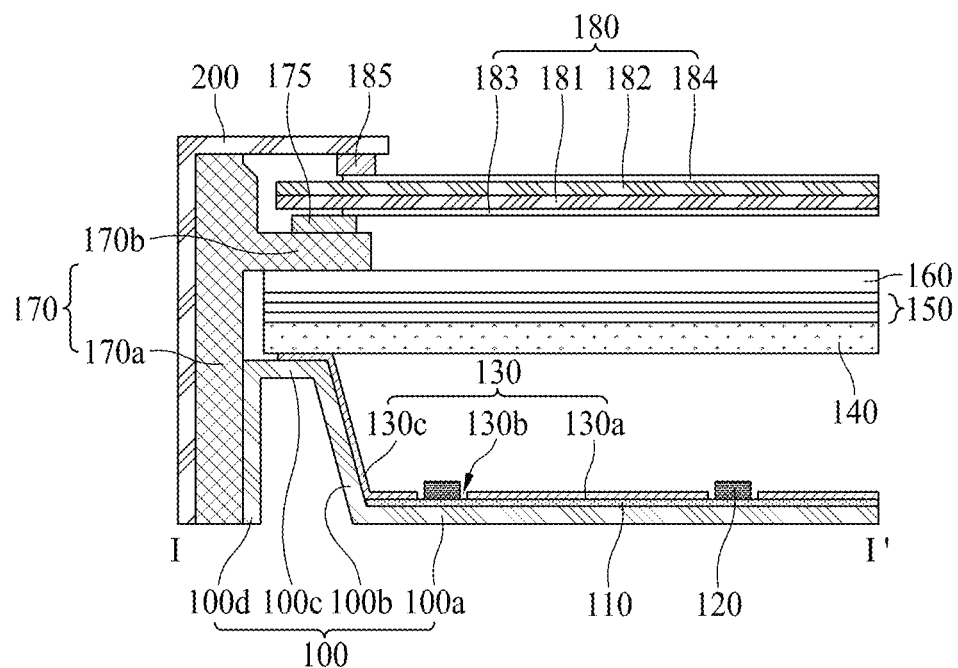
FIG. 3 is a cross-sectional view taken along line I-I' of FIG. 2, illustrating a display device according to one embodiment of the present disclosure.

FIG. 1 is a perspective view illustrating a display device according to one embodiment of the present disclosure, and FIG. 2 is a detailed exploded perspective view illustrating a display device according to one embodiment of the present disclosure. FIG. 3 is a cross-sectional view taken along line I-I' of FIG. 2, illustrating a display device according to one embodiment of the present disclosure.

Although the display device according to one embodiment of the present disclosure will be described to be realized as a liquid crystal display device, the display device may be realized as an organic light emitting display or an electrophoresis display device.

Referring to FIGS. 1 to 3, the display device according to the embodiment of the present disclosure comprises a lower case 100, a backlight unit BLU, an optical film 160, a panel guide 170, a liquid crystal panel 180, a panel driver 190, and an upper case 200.

The lower case 100 receives the backlight unit BLU and supports the panel guide 170. The lower case 100 is preferably made of a metal material to radiate heat generated from light sources. The lower case 100 according to one example may include a case bottom 100*a*, a first case side 100*b*, a case support surface 100*c*, and a second case side 100*d*.

The case bottom 100*a* is arranged to face the liquid crystal panel 180. The case bottom 100*a* receives the backlight unit BLU at an upper portion, and the backlight unit BLU is arranged to face the liquid crystal panel 180 and thus irradiate light to the liquid crystal panel 180.

The first case side 100*b* is extended from the case bottom 100*a* to constitute a side of the lower case 100.

The case support surface 100*c* is extended from the first case side 100*b* and arranged to face the liquid crystal panel 180. The case support surface 100*c* may support a diffuser 140, an optical sheet portion 150 and the optical film 160.

The second case side 100*d* is an outer side of the lower case 100, and is extended from the case support surface 100*c* to face the panel guide 170. The second case side 100*d* may be sealed by the panel guide 170, and may be coupled to the panel guide 170 and fixed thereto.

The backlight unit BLU is arranged below the liquid crystal panel 180 to irradiate light to a lower surface of the liquid crystal panel 180. The backlight unit BLU is received in the lower case 100.

Although the display device according to one embodiment of the present disclosure will be described to be realized a direct type liquid crystal display device in which light sources are arranged below the diffuser, the display device may be realized as an edge type liquid crystal display device in which light sources are arranged at one side of a light guide plate.

The backlight unit BLU according to one example may include a printed circuit board 110, light sources 120, a reflector 130, a diffuser 140, and an optical sheet portion 150.

The printed circuit board 110 for light sources is arranged on the lower case 100. The printed circuit board 110 packages a plurality of light sources 120 therein. The printed circuit board 110 includes a driving power line for receiving an external driving power, and supplies a driving power supplied from the outside through the driving power line to each of the plurality of light sources 120, whereby the lighting sources 120 emit light.

Each of the plurality of light sources 120 is arranged to be spaced apart from and in parallel with another light source on the printed circuit board 110 for light sources and then connected to a light source driving signal line. The plurality of light sources 120 irradiate light to a lower surface of the diffuser 140. The plurality of light sources 120 may emit light simultaneously or individually in accordance with a light source driving signal supplied from the light source driving signal line.

A lateral chip structure, a flip chip structure, a vertical chip structure, and a chip scale package structure may be applied to the light sources 120 according to one example. Each of the plurality of light sources 120 according to one example may be made of a chip scale package. In this case, each of the plurality of light sources 120 is directly packaged onto the printed circuit board 110, whereby a packaging process of the light sources 120 is not required in the present disclosure. As the light sources 120 are made of a chip scale package, the backlight unit BLU and the display device according to one example may have a thin thickness and an improved esthetic effect. The light sources 120 according to one example emit light of a first color in accordance with the light source driving signal. For example, the light sources 120 may be a white light emitting diode chip for emitting white light.

The reflector 130 is arranged on the printed circuit board 110. The reflector 130 may be made of a reflective material, or a reflective material such as Al is provided on a substrate to reflect light emitted from the light sources 120 toward the diffuser 140. The reflector 130 according to one example includes a member lower surface 130*a* and a member side 130*c*.

The member lower surface 130*a* is arranged on the printed circuit board 110. The member lower surface 130*a* reflects light, which is headed from the light sources 120 to a downward direction, toward the diffuser 140. The member lower surface 130*a* of the reflector 130 is provided with a plurality of light source insertion holes 130*b*. The light sources 120 packaged in the printed circuit board 110 through the plurality of light source insertion holes 130*b* may be arranged on the reflector 130.

The member side 130*c* may be extended from the member lower surface 130*a* and arranged to be inclined obliquely. The member side 130*c* reflects light, which is headed from the light sources 120 to a side direction, toward the diffuser 140. The member side 130*c* may be arranged to be extended to the case support surface 100*c* of the lower case 100.

The diffuser 140 is supported by the lower case 100, and is arranged to cover a front surface (i.e. the upper surface in the figure) of the lower case 100. The diffuser 140 is formed in a flat panel type having a certain thickness, and serves to diffuse light emitted from each of the plurality of light sources 120 and advance the light to the liquid crystal panel 180.

The optical sheet portion 150 is arranged on the diffuser 140. The optical sheet portion 150 serves to advance light to the liquid crystal panel 180 by condensing and diffusing light to increase luminance of the liquid crystal panel 180. Although the optical sheet portion 150 may include a lower diffusion sheet, a prism sheet, and an upper diffusion sheet, without limitation to this case, the optical sheet portion 150 may include a deposition combination of two or more selected from a diffusion sheet, a prism sheet, a dual brightness enhancement film, a lenticular sheet, and a micro lens sheet.

The prism sheet may include a plurality of prism patterns formed in parallel to have a triangular cross-section, wherein a maintain portion and a valley portion of the prism pattern may be rounded at a certain curvature.

The lenticular lens sheet may include a plurality of lenticular lens patterns formed in parallel to have a semi-circle or semi-elliptical shaped cross-section having a certain curvature.

The micro lens sheet may include a plurality of micro lens patterns formed at a certain height to have a semicircle or semi-elliptical shape.

Meanwhile, the optical sheet portion 150 may further include a protective sheet for protecting the optical sheet.

The optical film 160 is arranged on the optical sheet portion 150. The optical film 160 includes an optical pattern that absorbs incident light at a certain angle (i.e. light incident at a certain angle to the optical film) while light incident at other angles are emitted to the liquid crystal panel 180. Therefore, the optical film 160 according to one example may serve as a privacy film that provides image information to a specific person only located on a front side. Since the optical film of the related art absorbs light incident at a certain angle (i.e. a portion of the incident light), the light incident from the light sources is partially absorbed, whereby a problem occurs in that luminance of the display device is deteriorated. However, since the optical film 160 according to one embodiment of the present disclosure includes a reflective surface at one end of the optical pattern, light entering a base side of the optical pattern is reflected without being absorbed in the optical pattern and then recycled, whereby luminance is prevented from being deteriorated. A detailed description of the optical film 160 according to one embodiment of the present disclosure will be made with reference to FIGS. 4 to 12.

The panel guide 170 supports a rear edge of the liquid crystal panel 180 and surrounds the liquid crystal panel 180 and the backlight unit BLU. The panel guide 170 may be coupled to the liquid crystal panel 180 through a first panel coupling member 175. At this time, the first panel coupling member 175 is preferably coupled with a lower substrate 181 of the liquid crystal panel 180 considering a coupling force and thickness of the panel guide 170 and the liquid crystal panel 180. However, the first panel coupling member 175 may be coupled to a lower polarizing member 183 of the liquid crystal panel 180 without limitation to the lower substrate 181. The first panel coupling member 175 according to one example may be a double sided tape, a thermal hardening adhesive, a photo-hardening adhesive, or a foam tape. Preferably, the first panel coupling member 175 is a double sided tape or foam tape, which has a certain elastic force to absorb impact. Additionally, the first panel coupling member 175 may include a hollow portion. In this case, the hollow portion prevents delamination of the first panel coupling member 175 and the liquid crystal panel 180 during movement of the liquid crystal panel 180 while buffering a pressure applied to the liquid crystal panel 180.

The panel guide 170 according to one example may include a guide sidewall 170a and a panel coupling portion 170b.

The guide sidewall 170a may be arranged in the form of frame surrounding the side of the display device and the backlight unit BLU. The guide sidewall 170a may be provided with a coupling hook or a coupling groove and thus coupled with the lower case 100.

The panel coupling portion 170b is protruded from the guide sidewall 170a to face the edge of the liquid crystal panel 180. The panel coupling portion 170b is coupled to a rear edge portion of the liquid crystal panel 180 through the first panel coupling member 175. The panel coupling portion 170b is coupled to a rear edge portion of the lower substrate 181 by the first panel coupling member 175, and may be coupled to an edge portion of the lower polarizing member 183 attached to a rear surface (which can be also referred to as a lower surface) of the lower substrate 181.

The liquid crystal panel 180 is arranged on the backlight unit BLU. The liquid crystal panel 180 displays a predetermined color image in accordance with light transmittance of a liquid crystal layer (not shown) by driving the liquid crystal layer in accordance with an electric field formed per pixel by data and common voltages applied to each pixel. The liquid crystal panel 180 may include lower and upper substrates 181 and 182 bonded to each other, facing each other by interposing the liquid crystal layer therebetween, a lower polarizing member 183 attached to a rear surface of the lower substrate 181, and an upper polarizing member 184 attached to a front surface of the upper substrate 182.

Although not shown in the lower substrate 181, pixels are formed per crossing area between gate and data lines. The pixel includes a thin film transistor, a common electrode and a pixel electrode.

The thin film transistor serves as a switching transistor that transfers an electric signal to each pixel and controls the signal. A common voltage for driving liquid crystals is applied to the common electrode. The pixel electrode is arranged on a passivation film covering the common electrode and connected with the thin film transistor.

The lower substrate 181 controls light transmittance of the liquid crystal layer by forming an electric field corresponding to a differential voltage between the data voltage and the common voltage which are applied to each pixel. A pad portion (not shown), which includes a signal applying pad connected to a plurality of data lines, is arranged at the edge of the lower substrate 181.

Though not shown in the drawings, the upper substrate 182 may include a black matrix and a color filter. R (Red), G (Green) and B (Blue) patterns are formed in the color filter. The black matrix is respectively arranged among the R, G and B patterns of the color filter. A column spacer for maintaining a cell gap between the upper substrate 182 and the lower substrate 181 may be arranged in the upper substrate 182.

The upper substrate 182 is formed to have a size smaller than that of the lower substrate 181, exposes the pad portion of the lower substrate 181 while the liquid crystal layer (not shown) is interposed between the lower substrate and the upper substrate, and is bonded to the lower substrate 181.

Details of the lower substrate 181 and the upper substrate 182 may be formed in various shapes in accordance with a driving mode of the liquid crystal layer, for example, a TN (Twisted Nematic) mode, a VA (Vertical Alignment) mode, an IPS (In plane switching) mode, and an FFS (Fringe field switching) mode.

The lower polarizing member 183 is attached to the lower surface of the lower substrate 181, and polarizes light entering the lower substrate 181.

The upper polarizing member 184 is attached to the front surface of the upper substrate 182, and polarizes light emitted to the outside by transmitting the upper substrate 182.

The lower polarizing member 183 and the upper polarizing member 184 have their respective polarizing functions different from each other through elongation processes in contrary directions, and have contractile forces contrary to each other based on elongation. As the lower polarizing member 183 and the upper polarizing member 184 are respectively attached to the lower substrate 181 and the upper substrate 182, contractile forces of the lower polarizing member 183 and the upper polarizing member 184 are mutually counterbalanced, whereby the liquid crystal panel 180 forms a plane state without being bent upwardly or downwardly.

The panel driver 190 is connected to the pad portion provided in the lower substrate 181 to drive each pixel of the liquid crystal panel 180, whereby a predetermined color image is displayed on the liquid crystal panel 180. The panel driver 190 according to one example includes a plurality of circuit films 191 connected to the pad portion of the lower substrate 181 of the liquid crystal panel 180, a data driving integrated circuit 193 packaged in each of the plurality of circuit films 191, a display printed circuit board 192 coupled to each of the plurality of circuit films 191, and a timing controller 194 packaged in the display printed circuit board 192.

Each of the circuit films 191 is attached between the pad portion of the lower substrate 181 and the display printed circuit board 192 by a film attachment process, and may be made of a tape carrier package (TCP) or a chip on flexible board or chip on film (COF). Each of the plurality of the circuit films 191 may be bent along one side of the liquid crystal panel 180, that is, a lower side, and may be arranged on a rear surface of the panel guide 170.

The data driving integrated circuit 193 is packaged in each of the plurality of circuit films 191 and thus connected to the pad portion of the lower substrate 181 through the circuit films 191. The data driving integrated circuit 193 receives a data control signal and per-pixel data supplied from the timing controller 194, converts the per-pixel data to an analog type data signal in accordance with the data control signal, and supplies the converted data signal to a corresponding data line through the pad portion of the lower substrate 181.

The display printed circuit board 192 is connected with the plurality of circuit films 191. The display printed circuit board 192 serves to supply a signal required to display an image on each pixel of the liquid crystal panel 180 to the data driving integrated circuit 193 and a gate driving circuit (not shown). To this end, various signal lines (not shown), various power circuits (not shown), and a memory device (not shown) are packaged in the display printed circuit board 192.

The timing controller 194 is packaged in the display printed circuit board 192, generates per-pixel data by aligning digital image data, which are input from a driving system in response to a timing synchronization signal supplied from an external driving system (not shown), to be suitable for a pixel arrangement structure of the liquid crystal panel 180, and provides the generated per-pixel data to the data driving integrated circuit 193. Also, the timing controller 194 controls a driving timing of each of the data driving integrated circuit 193 and the gate driving circuit by generating each of a data control signal and a gate control signal on the basis of the timing synchronization signal.

Additionally, the timing controller 194 may individually control luminance per area of the liquid crystal panel 180 by controlling the backlight unit BLU through an edge type local dimming technique.

The upper case 200 may be arranged in the form of frame surrounding the backlight unit BLU and the display device. The upper case 200 may prevent a front edge portion of the liquid crystal panel 180 or the panel guide 170 from being exposed to the outside of the liquid crystal display device.

The upper case 200 is coupled to the panel guide 170 and fixes the liquid crystal panel 180 supported by the panel guide 170. The upper case 200 may be coupled to the guide sidewall 170a of the panel guide 170 in accordance with a side coupling method based on a coupling member such as a screw or a hook.

The upper case 200 may be coupled to the liquid crystal panel 180 through a second panel coupling member 185. The second panel coupling member 185 may be a double sided tape, a thermal hardening adhesive, a photo-hardening adhesive, or a foam tape. Preferably, the second panel coupling member 185 is a double sided tape or foam tape, which has a certain elastic force to absorb impact. Additionally, the second panel coupling member 185 may include a hollow portion. In this case, the hollow portion prevents delamination of the second panel coupling member 185 and the liquid crystal panel 180 during movement of the liquid crystal panel 180 while buffering a pressure applied to the liquid crystal panel 180.

As described above, the display device according to one embodiment of the present disclosure includes the optical film 160 having a reflective surface at one end of the optical pattern, whereby the optical film 160 may serve as a privacy film, which provides image information to a specific person only located at a front side, and may prevent luminance from being deteriorated.

Figure 4:
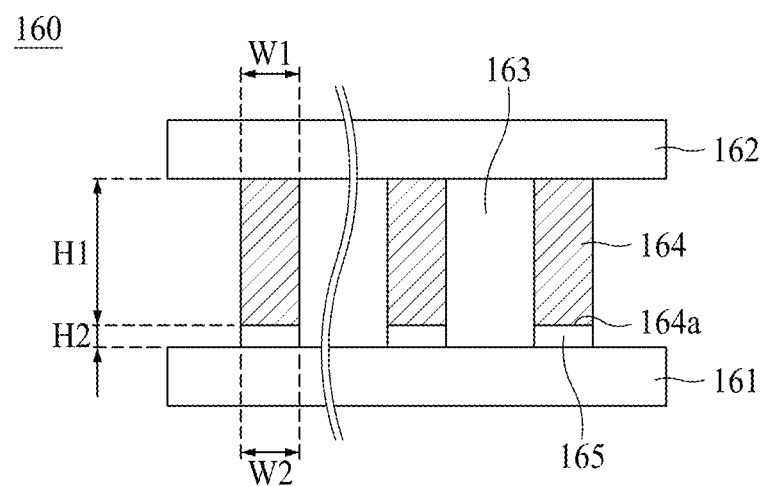
FIG. 4 is a cross-sectional view illustrating an optical film according to the first embodiment of the present disclosure.
Figure 5:
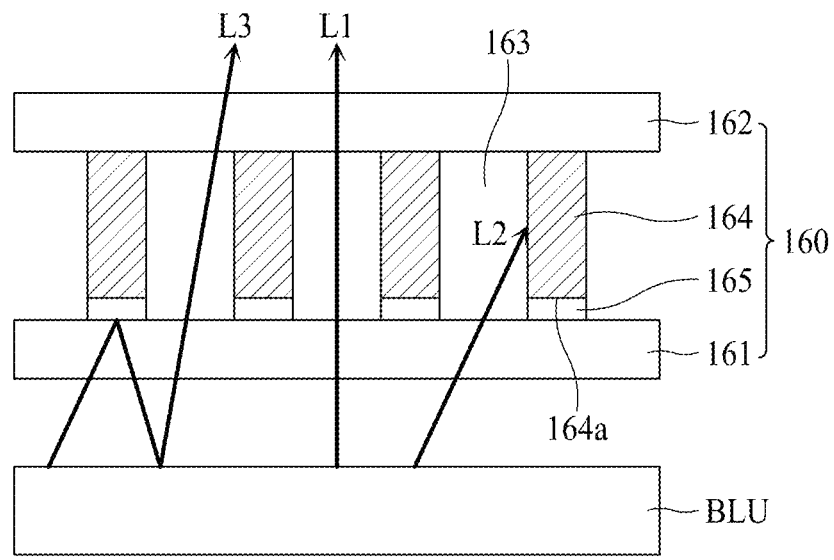
FIG. 5 is a cross-sectional view illustrating an optical path of an optical film according to the first embodiment of the present disclosure.

FIG. 4 is a cross-sectional view illustrating an optical film according to the first embodiment of the present disclosure, and FIG. 5 is a cross-sectional view illustrating an optical path of an optical film according to the first embodiment of the present disclosure.

Referring to FIGS. 4 and 5, the optical film according to the first embodiment of the present disclosure includes a first base film 161, a second base film 162, a light transmitting layer 163, an optical pattern 164, and a reflective member 165.

The first base film 161 and the second base film 162 are arranged to be spaced apart from and face each other. The light transmitting layer 163, the optical pattern 164 and the reflective member 165 are arranged between the first base film 161 and the second base film 162. The first base film 161 and the second base film 162 protect the light transmitting layer 163 and the optical pattern 164 and prevent the light transmitting layer 163 and the optical pattern 164 from being distorted. The first base film 161 and the second base film 162 may be made of a transparent material such as polycarbonate, for example.

The light transmitting layer 163 is arranged between the first base film 161 and the second base film 162. The light transmitting layer 163 may be arranged to surround the optical pattern 164 to maintain the optical pattern 164 at a certain angle. The light transmitting layer 163 transmits light entering the optical film 160. The light transmitting layer 163 may include a polymer having high light transmittance. For example, a thermoplastic resin, a thermosetting resin, and a UV hardening resin may be used as the light transmitting layer 163. Examples of the resin may include, but not limited to, a cellulose resin (for example, cellulose acetate butylate, cellulose triacetate, etc.), a polyolefin resin (for example, polyethylene, polypropylene, etc.), a polyester resin (for example, polyethylene terephthalate, etc.), polystyrene, polyurethane, polyvinylchloride, acrylic resin, and a polycarbonate resin.

The optical pattern 164 is arranged between the first base film 161 and the second base film 162 and between the light transmitting layers 163. The optical pattern 164 absorbs light incident at a certain angle to the optical film 160 while light incident at other angles to the optical film 160 are emitted. Therefore, the optical film 160 to which the optical pattern 164 is applied may provide image information to a specific person only located at a front side of the display device or allow a user to view image information in a desired direction only.

The optical pattern 164 according to one example is formed of a material that absorbs or shields light. Examples of the material, which absorbs or shields light, may include, but not limited to, a dark pigment such as black pigment or gray pigment, a dark dye such as black dye or gray dye, metal such as Al or Ag, a metal oxide, and a polymer of the dark pigment or the dark dye.

At this time, an angle of the optical pattern 164 with respect to the first base film 161 may be set in accordance with a purpose of the optical film 160. For example, the angle of the optical pattern 164 with respect to the first base film 161 may be 90°, approximately as shown in FIGS. 4 and 5. If the optical film 160 is applied to the display device, light is irradiated to a user located at a front side of a screen and is not irradiated to other areas, whereby only the user located at a front side may view image information.

The optical pattern 164 of the optical film 160 according to the first embodiment of the present disclosure has a reflective surface 164a at one end. In more detail, when the first base film 161 is arranged to be closer to the backlight unit BLU than the second base film 164, the reflective surface 164a is arranged to be close to the first base film 161.

In the optical film 160 according to the first embodiment of the present disclosure, the reflective surface 164a of the optical pattern 164 is provided with a reflective member 165. The reflective member 165 reflects light, which enters the base side of the optical pattern 164 from the light sources, in an opposite direction. Since the optical film of the related art absorbs light incident at a certain angle, a problem occurs in that the light incident from the light sources is partially absorbed to deteriorate luminance of the display device. However, since the optical film 160 according to the first embodiment of the present disclosure includes the reflective member 165 arranged at one end of the optical pattern 164, light entering the base side of the optical pattern 164 is reflected without being absorbed in the optical pattern 164 and then recycled, whereby luminance is prevented from being deteriorated.

In more detail, referring to FIG. 5, first light L1 entering the light transmitting layer 163 of the optical film 160 from the backlight unit BLU transmits the optical film 160 and enters the liquid crystal panel 180. Second light L2 entering the optical pattern 164 of the optical film 160 from the backlight unit BLU is absorbed in the optical pattern 164, and is not emitted to the outside of the optical film 160. Third light L3 entering the reflective member 165 of the optical film 160 from the backlight unit BLU is reflected back to the backlight unit BLU disposed at a lower portion, and randomly re-enters the optical film 160 from the backlight unit BLU. Therefore, in the optical film 160 according to the first embodiment of the present disclosure, among the light that enters the optical film 160 at a certain angle and thus is going to arrive at the optical pattern 164, the light L3 entering the reflective member 165 arranged on the reflective surface 164a is recycled through scattering and reflection without being absorbed in the optical pattern 164, whereby luminance of the display device may be prevented from being deteriorated by the optical pattern 164.

At this time, in the optical film 160 according to the first embodiment of the present disclosure, a width W2 of the reflective member 165 is smaller than or equal to a width W1 of the optical pattern 164. Preferably, when the width W2 of the reflective member 165 is equal to the width W1 of the optical pattern 164, the light entering the reflective surface 164a of the optical pattern 164 may be recycled by the reflective member 165. If the width W2 of the reflective member 165 is smaller than the width W1 of the optical pattern 164, the light entering the base side of the optical pattern 164 from the light sources may partially be absorbed in the optical pattern 164 but the reflective member 165 may serve as a privacy film and enhance luminance. However, if the width W2 of the reflective member 165 is greater than the width W1 of the optical pattern 164, since the light normally emitted through the light transmitting layer 163 may again enter the backlight unit BLU by the reflective member 165, luminance of the display device may be deteriorated.

Also, in the optical film 160 according to the first embodiment of the present disclosure, a height H2 of the reflective member 165 is lower than a height H1 of the optical pattern 164. If the height H2 of the reflective member 165 is equal to or greater than the height H1 of the optical pattern 164, the light which should be absorbed by the optical pattern 164 may be emitted to the outside of the optical film 160 after being reflected in the reflective member 165, and the function of the reflective member 165 as a privacy film may be deteriorated.

Figure 6:
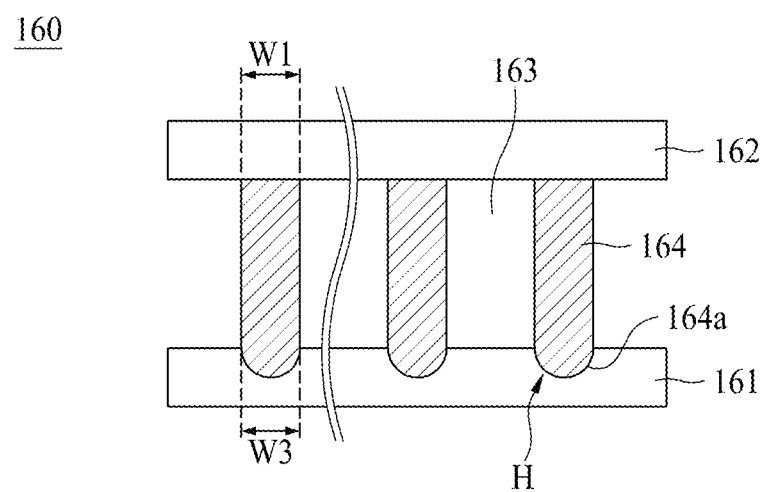
FIG. 6 is a cross-sectional view illustrating an optical film according to the second embodiment of the present disclosure.

FIG. 6 is a cross-sectional view illustrating an optical film according to the second embodiment of the present disclosure.

The optical film 160 according to the second embodiment of the present disclosure shown in FIG. 6 is the same as the optical film 160 according to the first embodiment described with reference to FIG. 4 except different configurations of a first base film 161 and an optical pattern 164 and absence of a reflective member 165. Therefore, in the following description, only the first base film 161 and the optical pattern 164 will be described, and repeated description of the same elements will be omitted.

Referring to FIG. 6, in the optical film 160 according to the second embodiment of the present disclosure, the first base film 161 is in contact with the reflective surface 164a of the optical pattern 164. Also, in the optical film 160 according to the second embodiment of the present disclosure, the first base film 161 is provided with a reflective groove H at a position corresponding to the optical pattern 164. The reflective groove H of the first base film 161 according to the second embodiment of the present disclosure has a hemispheric shape or a lenticular shape.

The optical pattern 164 of the optical film 160 according to the second embodiment of the present disclosure has a reflective surface 164a at one end. The reflective surface 164a is inserted into the reflective groove H of the first base film 161. That is, in the optical pattern 164 of the optical film 160 according to the second embodiment of the present disclosure, the reflective surface 164a of one end has the same shape as that of the reflective groove H, and has a hemispheric shape or a lenticular shape. The hemispheric or lenticular shaped reflective surface 164a refracts the light, which enters the base side of the optical pattern 164 from the light sources, in an opposite direction.

In the optical film 160 according to the second embodiment of the present disclosure, as the reflective surface 164a of the optical pattern 164 has a hemispheric shape or a lenticular shape, among the light that enters the optical film 160 at a certain angle and thus arrives at the optical pattern 164, the light entering the reflective surface 164a is recycled through refraction without being absorbed in the optical pattern 164, whereby luminance of the display device may be prevented from being deteriorated.

At this time, in the optical film 160 according to the second embodiment of the present disclosure, a width W3 of the reflective groove H of the first base film 161 is smaller than or equal to the width W1 of the optical pattern 164. Preferably, when the width W3 of the reflective groove H is equal to the width W1 of the optical pattern 164, the light entering the reflective surface 164a of the optical pattern 164 may be recycled by the reflective groove H. If the width W3 of the reflective groove H is smaller than the width W1 of the optical pattern 164, the light entering the base side of the optical pattern 164 from the light sources may partially be absorbed in the optical pattern 164 but the reflective groove H may serve as a privacy film and enhance luminance. However, if the width W3 of the reflective groove H is greater than the width W1 of the optical pattern 164, since the light normally emitted through the light transmitting layer 163 may again enter the backlight unit BLU by the reflective groove H, luminance of the display device may be deteriorated. Also, in the optical film 160 according to the second embodiment of the present disclosure, if the reflective groove H of the first base film 161 has a hemispheric shape, a size of a radius R is smaller than or equal to a half of the width W1 of the optical pattern 164. That is, the hemispheric reflective groove H is provided so as not to get out of the width W1 of the optical pattern 164.

Figure 7:
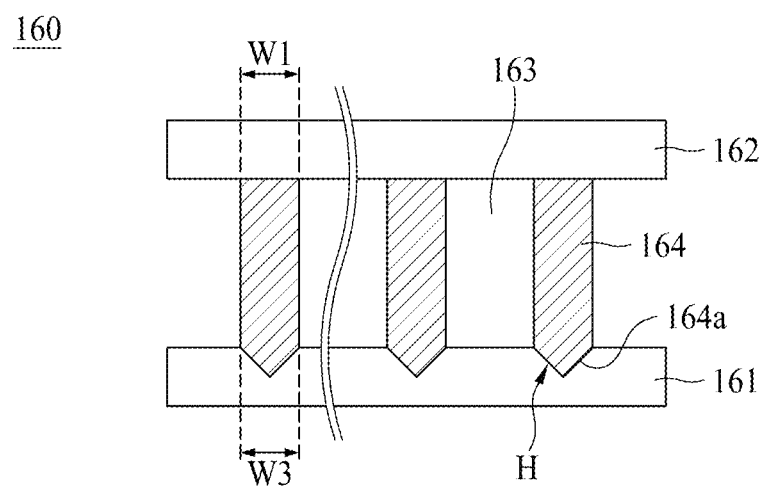
FIG. 7 is a cross-sectional view illustrating an optical film according to the third embodiment of the present disclosure.

FIG. 7 is a cross-sectional view illustrating an optical film according to the third embodiment of the present disclosure.

The optical film 160 according to the third embodiment of the present disclosure shown in FIG. 7 is the same as the optical film 160 according to the second embodiment described with reference to FIG. 6 except a first base film 161 and an optical pattern 164. Therefore, in the following description, only the first base film 161 and the optical pattern 164 will be described, and repeated description of the same elements will be omitted.

Referring to FIG. 7, in the optical film 160 according to the third embodiment of the present disclosure, the first base film 161 is in contact with the reflective surface 164a of the optical pattern 164. Also, in the optical film 160 according to the third embodiment of the present disclosure, the first base film 161 is provided with a reflective groove H at a position corresponding to the optical pattern 164. The reflective groove H of the first base film 161 of the optical film 160 according to the third embodiment of the present disclosure has a prism shape.

The optical pattern 164 of the optical film 160 according to the third embodiment of the present disclosure has a reflective surface 164a at one end. The reflective surface 164a is inserted into the reflective groove H of the first base film 161. That is, in the optical pattern 164 of the optical film 160 according to the third embodiment of the present disclosure, the reflective surface 164a at one end has the same shape as that of the reflective groove H, and has a prism shape. The prism shaped reflective surface 164a refracts the light, which enters the base side of the optical pattern 164 from the light sources, in an opposite direction.

In the optical film 160 according to the third embodiment of the present disclosure, as the reflective surface 164a of the optical pattern 164 has a prism shape, among the light that enters the optical film 160 at a certain angle and thus arrives at the optical pattern 164, the light entering the reflective surface 164a is recycled through refraction without being absorbed in the optical pattern 164, whereby luminance of the display device may be prevented from being deteriorated.

At this time, in the optical film 160 according to the third embodiment of the present disclosure, a width W3 of the reflective groove H of the first base film 161 is smaller than or equal to the width W1 of the optical pattern 164. Preferably, when the width W3 of the reflective groove H is equal to the width W1 of the optical pattern 164, the light entering the reflective surface 164a of the optical pattern 164 may be recycled by the reflective groove H. If the width W3 of the reflective groove H is smaller than the width W1 of the optical pattern 164, the light entering the base side of the optical pattern 164 from the light sources may partially be absorbed in the optical pattern 164 but the reflective groove H may serve as a privacy film and enhance luminance. However, if the width W3 of the reflective groove H is greater than the width W1 of the optical pattern 164, since the light normally emitted through the light transmitting layer 163 may again enter the backlight unit BLU by the reflective groove H, luminance of the display device may be deteriorated. Also, in the optical film 160 according to the third embodiment of the present disclosure, the prism shaped reflective surface 164a has a width of a prism smaller than or equal to the width W1 of the optical pattern 164. That is, the prism shaped reflective surface 164a is provided so as not to get out of the width W1 of the optical pattern 164.

Figure 8:
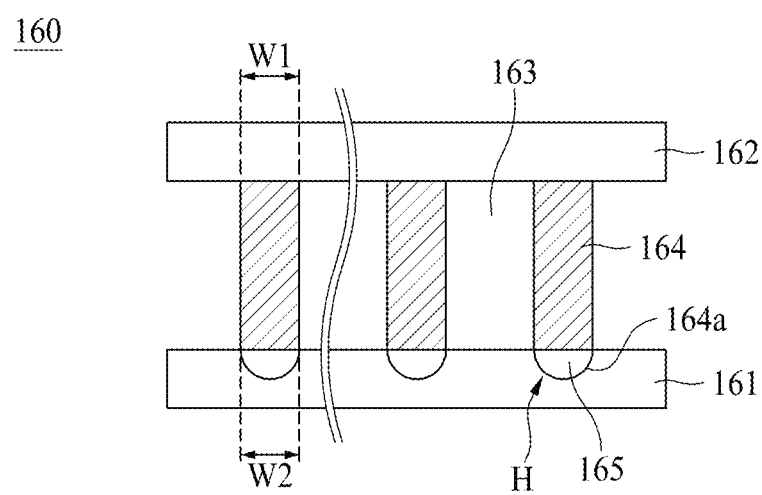
FIG. 8 is a cross-sectional view illustrating an optical film according to the fourth embodiment of the present disclosure.

FIG. 8 is a cross-sectional view illustrating an optical film according to the fourth embodiment of the present disclosure.

The optical film 160 according to the fourth embodiment of the present disclosure shown in FIG. 8 is the same as the optical film 160 according to the second embodiment described with reference to FIG. 6 except an optical pattern 164 and a reflective member 165. Therefore, in the following description, only the optical pattern 164 and the reflective member 165 will be described, and repeated description of the same elements will be omitted.

Referring to FIG. 8, in the optical film 160 according to the fourth embodiment of the present disclosure, the optical pattern 164 has a reflective surface 164a at one end, and the reflective surface 164a is provided with (or, includes) a hemispheric or lenticular shaped reflective member 165. As an example, the reflective member 165 is made of a different material or by a separate process from the reflective surface 164a. In the optical film 160 according to the fourth embodiment of the present disclosure, the reflective member 165 is inserted into the hemispheric or lenticular shaped reflective groove H. That is, the reflective member 165 has the same shape as that of the reflective groove H. In the optical film 160 according to the fourth embodiment of the present disclosure, the reflective groove H of the first base film 161 is filled with the reflective member 165. The hemispheric or lenticular shaped reflective member 165 scatters, reflects and refracts the light, which enters the base side of the optical pattern 164 from the light sources, in an opposite direction.

In the optical film 160 according to the fourth embodiment of the present disclosure, as the reflective member 165 has a hemispheric shape or a lenticular shape, among the light that enters the optical film 160 at a certain angle and thus arrives at the optical pattern 164, the light entering the reflective surface 164a is recycled through scattering, reflection and refraction without being absorbed in the optical pattern 164, whereby luminance of the display device may be prevented from being deteriorated.

At this time, in the optical film 160 according to the fourth embodiment of the present disclosure, a width W2 of the reflective member 165 is smaller than or equal to the width W1 of the optical pattern 164. Preferably, when the width W2 of the reflective member 165 is equal to the width W1 of the optical pattern 164, the light entering the reflective surface 164a of the optical pattern 164 may be recycled by the reflective member 165. If the width W2 of the reflective member 165 is smaller than the width W1 of the optical pattern 164, the light entering the base side of the optical pattern 164 from the light sources may partially be absorbed in the optical pattern 164 but the reflective member 165 may serve as a privacy film and enhance luminance. However, if the width W2 of the reflective member 165 is greater than the width W1 of the optical pattern 164, since the light normally emitted through the light transmitting layer 163 may again enter the backlight unit BLU by the reflective member 165, luminance of the display device may be deteriorated.

Figure 9:
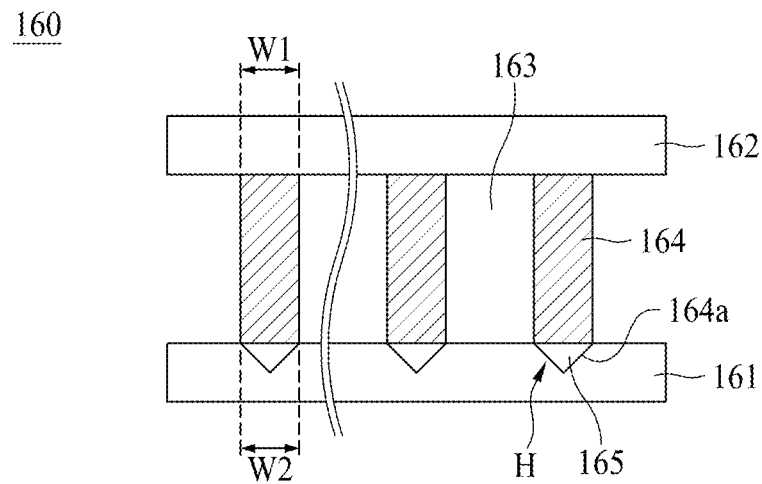
FIG. 9 is a cross-sectional view illustrating an optical film according to the fifth embodiment of the present disclosure.

FIG. 9 is a cross-sectional view illustrating an optical film according to the fifth embodiment of the present disclosure.

The optical film 160 according to the fifth embodiment of the present disclosure shown in FIG. 9 is the same as the optical film 160 according to the fourth embodiment described with reference to FIG. 8 except a first base film 161 and a reflective member 165. Therefore, in the following description, only the first base film 161 and the reflective member 165 will be described, and repeated description of the same elements will be omitted.

Referring to FIG. 9, in the optical film 160 according to the fifth embodiment of the present disclosure, the first base film 161 is provided with a reflective groove H at a position corresponding to the optical pattern 164. The reflective groove H of the first base film 161 of the optical film 160 according to the fifth embodiment of the present disclosure has a prism shape.

In the optical film 160 according to the fifth embodiment of the present disclosure, the optical pattern 164 has a reflective surface 164a at one end. The reflective surface 164a is provided with (or, includes) a prism shaped reflective member 165. In the optical film 160 according to the fifth embodiment of the present disclosure, the reflective member 165 is inserted into the prism shaped reflective groove H. That is, the reflective member 165 has the same shape as that of the reflective groove H. In the optical film 160 according to the fifth embodiment of the present disclosure, the reflective groove H of the first base film 161 is filled with the reflective member 165. This prism shaped reflective member 165 scatters, reflects and refracts the light, which enters the base side of the optical pattern 164 from the light sources, in an opposite direction.

In the optical film 160 according to the fifth embodiment of the present disclosure, as the reflective member 165 has a prism shape, among the light that enters the optical film 160 at a certain angle and thus arrives at the optical pattern 164, the light entering the reflective surface 164a is recycled through scattering, reflection and refraction without being absorbed in the optical pattern 164, whereby luminance of the display device may be prevented from being deteriorated.

At this time, in the optical film 160 according to the fifth embodiment of the present disclosure, a width W2 of the reflective member 165 is smaller than or equal to the width W1 of the optical pattern 164. Preferably, when the width W2 of the reflective member 165 is equal to the width W1 of the optical pattern 164, the light entering the reflective surface 164a of the optical pattern 164 may be recycled by the reflective member 165. If the width W2 of the reflective member 165 is smaller than the width W1 of the optical pattern 164, the light entering the base side of the optical pattern 164 from the light sources may partially be absorbed in the optical pattern 164 but the reflective member 165 may serve as a privacy film and enhance luminance. However, if the width W2 of the reflective member 165 is greater than the width W1 of the optical pattern 164, since the light normally emitted through the light transmitting layer 163 may again enter the backlight unit BLU by the reflective member 165, luminance of the display device may be deteriorated.

Figure 10:
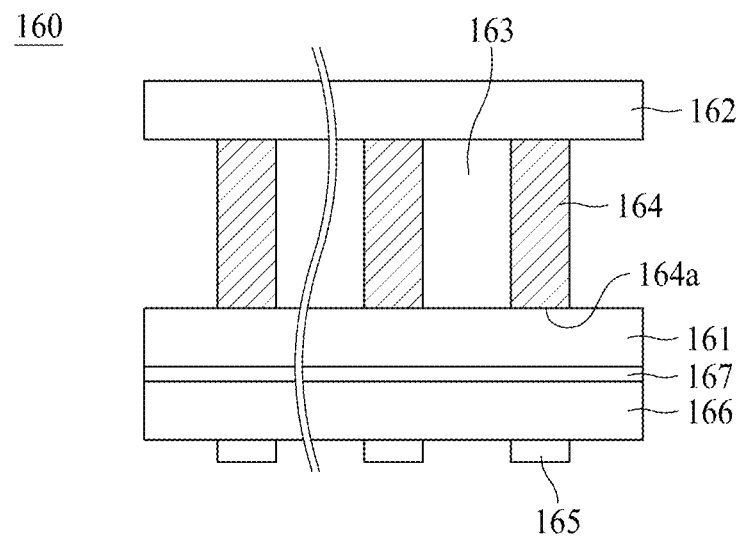
FIG. 10 is a cross-sectional view illustrating an optical film according to the sixth embodiment of the present disclosure.

FIG. 10 is a cross-sectional view illustrating an optical film according to the sixth embodiment of the present disclosure.

The optical film 160 according to the sixth embodiment of the present disclosure shown in FIG. 10 is the same as the optical film 160 according to the first embodiment described with reference to FIG. 4 except a third base film 166 and a reflective member 165. Therefore, in the following description, only the third base film 166 and the reflective member 165 will be described, and repeated description of the same elements will be omitted.

Referring to FIG. 10, in the optical film 160 according to the sixth embodiment of the present disclosure, the light transmitting layer 163 and the optical pattern 164 are arranged between the first base film 161 and the second base film 162, and the third base film 166 provided with the reflective member 165 is attached to a lower surface of the first base film 161. That is, in the optical film 160 according to the sixth embodiment of the present disclosure, the third base film 166 provided with the reflective member 165 is attached to the optical film 160 according to the first embodiment, which is not provided with the reflective member 165, by an adhesive member 167, whereby the light entering the base side of the optical pattern 164 is reflected and recycled without being absorbed in the optical pattern 164 to prevent luminance from being deteriorated.

Figure 11:
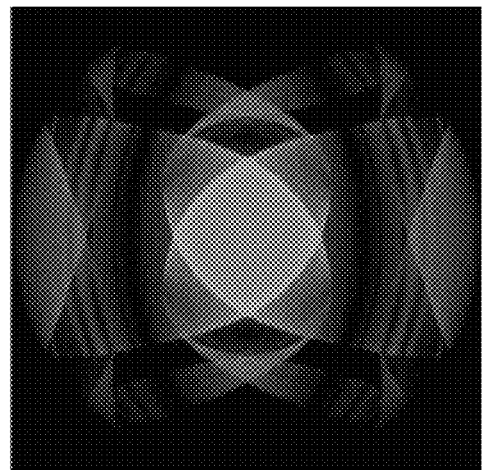
FIGS. 11 and 12 are views illustrating optical profiles of backlight units which are different according to configuration regarding an optical film and an optical sheet portion.
Figure 11:
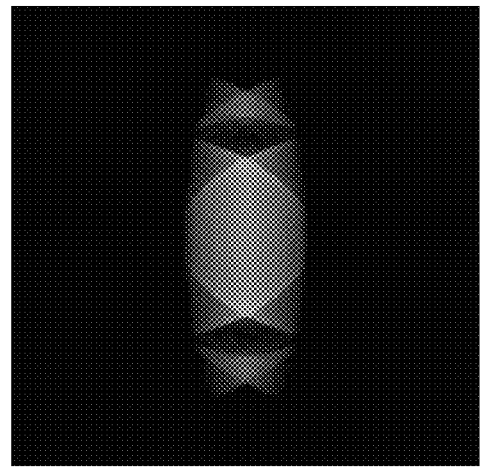
Figure 11:
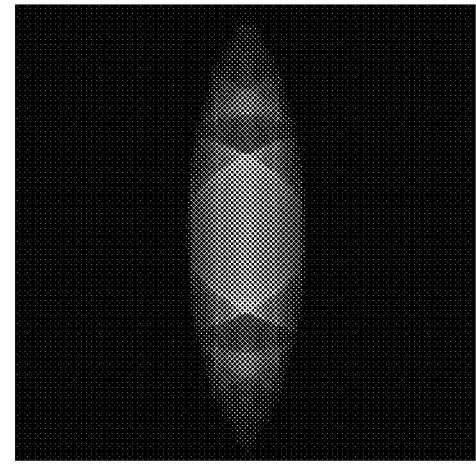
Figure 12:
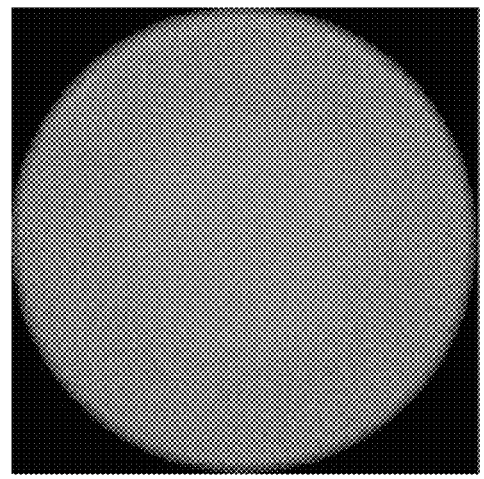
Figure 12:
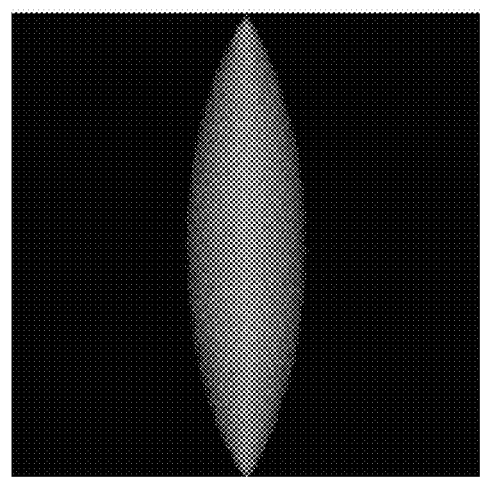
Figure 12:
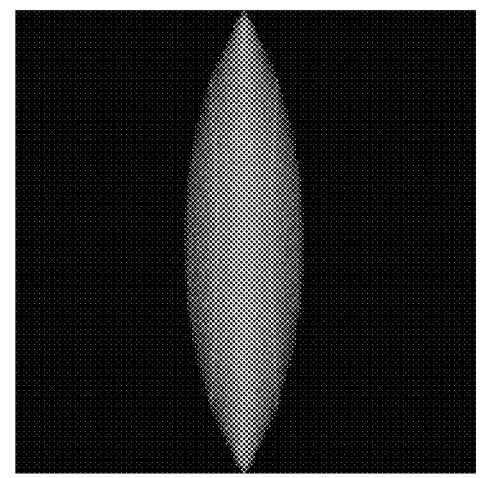

FIGS. 11 and 12 are views illustrating optical profiles of backlight units that are different in accordance with configurations regarding an optical film and an optical sheet portion. Persons skilled in the art can apply any suitable conventional methods for measuring optical profiles to the corresponding backlight units, thus obtaining the optical profiles shown in FIGS. 11 and 12; hence, no detailed illustration in this regard is provided here.

The optical sheet portion according to one example, which causes a backlight unit to have optical profiles of (a) to (c) in FIG. 11, includes a lower diffusion sheet, a lower prism sheet, and an upper prism sheet. If the optical film is not applied to the backlight unit BLU to which the optical sheet portion 150 according to one example is applied, the backlight unit BLU has luminance of 134% as shown in (a) in FIG. 11.

Also, if the optical film which is not provided with the reflective surface 164a of the related art is applied to the backlight unit BLU provided with the optical sheet portion 150 according to one example, the backlight unit BLU has luminance of 100% as shown in (b) in FIG. 11.

At this time, if the optical film 160 according to the first embodiment of the present disclosure is applied to the backlight unit BLU provided with the optical sheet portion 150 according to one example, the backlight unit BLU has luminance of 110% as shown in (c) in FIG. 11. If the optical film 160 according to the first embodiment of the present disclosure is applied to the backlight unit BLU, luminance is deteriorated as compared with the case that the optical film 160 is not applied to the backlight unit BLU, but luminance of the backlight unit BLU is higher as much as 10% than the case that the optical film which is not provided with the reflective surface 164a of the related art is applied to the backlight unit BLU.

The optical sheet portion according to another example, which causes a backlight unit to have optical profiles of (a) to (c) in FIG. 12, includes a lower diffusion sheet and an upper diffusion sheet. If the optical film is not applied to the backlight unit BLU to which the optical sheet portion 150 according to another example is applied, the backlight unit BLU has luminance of 140% as shown in (a) in FIG. 12.

Also, if the optical film which is not provided with the reflective surface 164a of the related art is applied to the backlight unit BLU provided with the optical sheet portion 150 according to another example, the backlight unit BLU has luminance of 100% as shown in (b) in FIG. 12.

At this time, if the optical film 160 according to the first embodiment of the present disclosure is applied to the backlight unit BLU provided with the optical sheet portion 150 according to another example, the backlight unit BLU has luminance of 130% as shown in (c) in FIG. 12. If the optical film 160 according to the first embodiment of the present disclosure is applied to the backlight unit BLU, luminance is deteriorated as compared with the case that the optical film 160 is not applied to the backlight unit BLU, but luminance of the backlight unit BLU is higher as much as 30% than the case that the optical film which is not provided with the reflective surface 164a of the related art is applied to the backlight unit BLU. Also, if the optical film 160 according to the first embodiment of the present disclosure is applied to the backlight unit BLU, a difference of 10% in luminance is generated as compared with the case that the optical film 160 is not applied to the backlight unit BLU.

The optical sheet portion 150 according to another example which causes a backlight unit to have optical profiles of (a) to (c) in FIG. 12, further includes the upper diffusion sheet without including a prism sheet unlike the optical sheet portion 150 according to one example, which causes a backlight unit to have optical profiles of (a) to (c) in FIG. 11. At this time, the diffusion sheet re-reflects the light, which is reflected from the reflective surface 164a of the optical pattern 164 of the optical film 160 according to the first embodiment of the present disclosure, more upwardly than the prism sheet. Therefore, the optical film 160 according to the first embodiment of the present disclosure may enhance luminance of the display device by recycling the light reflected from the reflective surface 164a if the optical sheet portion 150 includes more diffusion sheets.

As described above, according to the present disclosure, the following advantages may be obtained.

Since the optical film according to one embodiment of the present disclosure includes the reflective surface at one end of the optical pattern, the optical film may serve as a privacy film, which provides image information to a specific person only located at a front side, and the light entering the base side of the optical pattern is reflected and recycled without being absorbed in the optical pattern, whereby luminance may be prevented from being deteriorated.

In addition to the effects of the present disclosure as mentioned above, additional advantages and features of the present disclosure will be clearly understood by those skilled in the art from the above description of the present disclosure.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device including an optical film comprising:
a printed circuit board;
light sources packaged in the printed circuit board;
an optical sheet portion arranged on the light sources;
the optical film arranged on the optical sheet portion; and
a liquid crystal panel arranged on the optical film,
wherein the optical film comprises:
   a first base film;
   a second base film spaced apart from the first base film to face the first base film; and
   an optical pattern arranged between the first base film and the second base film, absorbing a portion of light incident to the optical film,
   wherein the optical pattern has a reflective surface at one end,
   wherein the first base film is in contact with the reflective surface, and is provided with a reflective groove on a surface which is in contact with the reflective surface.

2. The display device of claim 1, wherein the reflective groove has a hemispheric or prism shape.

3. The display device of claim 2, wherein the reflective groove is filled with a reflective member, or the reflective surface is inserted to the reflective groove.

4. The display device of claim 1, wherein the reflective groove has a width smaller than or equal to that of the optical pattern.

5. An optical film comprising:
a first base film;
a second base film spaced apart from the first base film to face the first base film; and
an optical pattern arranged between the first base film and the second base film, absorbing a portion of light incident to the optical film,
wherein the optical pattern has a reflective surface at one end, wherein the optical pattern has the reflective surface at one end which is close to the first base film, and wherein the optical film further includes a third base film on an opposite surface of a surface of the first base film facing the optical pattern, and the third base film is provided with a reflective member at a position corresponding to the optical pattern.

\* \* \* \* \*